(12) United States Patent
Panitzky et al.

(10) Patent No.: US 7,598,329 B2
(45) Date of Patent: Oct. 6, 2009

(54) PROCESS FOR MANUFACTURING ULTRA HIGH MOLECULAR WEIGHT POLYMERS USING NOVEL BRIDGED METALLOCENE CATALYSTS

(75) Inventors: Jens Panitzky, Dorsten (DE); Jens Ehlers, Hamminkeln (DE); Tim Dickner, Frankfurt (DE); Jorg Schottek, Idstein (DE)

(73) Assignee: Ticona GmbH, Kelsterbach (DE)

( * ) Notice: Subject to any disclaimer, the term of this patent is extended or adjusted under 35 U.S.C. 154(b) by 100 days.

(21) Appl. No.: 11/592,538

(22) Filed: Nov. 3, 2006

(65) Prior Publication Data

US 2007/0105712 A1    May 10, 2007

Related U.S. Application Data

(60) Provisional application No. 60/735,438, filed on Nov. 10, 2005.

(30) Foreign Application Priority Data

Nov. 4, 2005    (DE)    ........................ 10 2005 052 654

(51) Int. Cl.
   *C08F 4/64*    (2006.01)
   *C08F 4/72*    (2006.01)
(52) U.S. Cl. ................. 526/161; 526/172; 526/943; 526/941; 526/352; 526/348.6; 526/348.5
(58) Field of Classification Search ............... 526/160, 526/170, 352, 172, 162
   See application file for complete search history.

(56) References Cited

U.S. PATENT DOCUMENTS

| 5,449,650 | A |   | 9/1995 | Sugano et al. ............. 502/117 |
|---|---|---|---|---|
| 5,585,448 | A | * | 12/1996 | Resconi et al. ............. 526/170 |
| 6,096,912 | A | * | 8/2000 | Karl et al. ..................... 556/11 |
| 6,124,231 | A |   | 9/2000 | Fritze et al. ................. 502/152 |
| 6,255,531 | B1 |   | 7/2001 | Fritz et al. ..................... 568/3 |
| 6,271,164 | B1 |   | 8/2001 | Fritze et al. ................. 502/104 |
| 6,329,313 | B1 |   | 12/2001 | Fritze et al. ................. 502/202 |
| 6,350,829 | B1 |   | 2/2002 | Lynch et al. ................. 526/151 |
| 6,444,603 | B1 |   | 9/2002 | Tohi et al. ................... 502/103 |
| 6,482,902 | B1 |   | 11/2002 | Bohnen et al. ............. 526/127 |
| 6,559,249 | B2 |   | 5/2003 | Yang et al. ................. 526/124.3 |
| 7,005,398 | B2 | * | 2/2006 | Ishigaki et al. ............. 502/109 |
| 7,109,278 | B2 | * | 9/2006 | Okumura et al. ........... 526/170 |
| 7,169,864 | B2 | * | 1/2007 | Paczkowski et al. ........ 526/129 |

FOREIGN PATENT DOCUMENTS

| DE | 3833445 A1 |   | 4/1990 |
|---|---|---|---|
| EP | 0 186 995 A2 |   | 7/1986 |
| EP | 0 575 840 A1 |   | 12/1993 |
| EP | 0 643 078 A2 |   | 3/1995 |
| EP | 0 798 306 A1 |   | 10/1997 |
| JP | 2005-029731 A | * | 2/2005 |
| JP | 2005-313391 A | * | 11/2005 |
| JP | 2005-314544 A | * | 11/2005 |
| WO | WO 91/02012 A1 | * | 2/1991 |
| WO | WO 94/28034 |   | 12/1994 |
| WO | WO 97/19959 |   | 6/1997 |
| WO | WO 01/55231 |   | 9/2001 |
| WO | WO 02/50134 A1 | * | 6/2002 |
| WO | WO 03/045551 A1 | * | 6/2003 |

OTHER PUBLICATIONS

Three-Coordinate Aluminum Is Not a Prerequisite for Catalystic Activity in the Zirconocene-Alumoxane Polymerization of Ethylene, C. Jeff Harlan et al., J. Am. Chem. Soc., 117 (1995), 6465-74; "tert-Butylaluminum Hydroxides and Oxides: Structural Relationship Between Alkylalumoxanes and Alumina Gels", C. Jeff Harlan et al., J. Am. Chem. Soc., Organometallics 13 (1994), 2957-2969. "Alumoxanes: Synthesis, Structures, Complexes and Reactions", S. Pasynkiewicz, Polyhedron 9 (1990), No. 2/3, 429-453; and FI Catalysts: A New Family of High Performance Catalysts for Olefin Polymerization:, H. Makio et al., Adv. Synth. Catal. 2002, No. 5, 344, 477-493.

* cited by examiner

*Primary Examiner*—David Wu
*Assistant Examiner*—Rip A. Lee
(74) *Attorney, Agent, or Firm*—Michael W. Ferrell

(57) ABSTRACT

The present invention relates to a process for manufacturing ultra high molecular weight polymers by means of polymerization and co-polymerization of olefins using novel bridged metallocene catalysts as well as their catalyst systems.

28 Claims, No Drawings

PROCESS FOR MANUFACTURING ULTRA HIGH MOLECULAR WEIGHT POLYMERS USING NOVEL BRIDGED METALLOCENE CATALYSTS

CLAIM FOR PRIORITY

This application is based on German Patent Application No. DE 10 2005 052654.3, filed Nov. 4, 2005, and also U.S. Provisional Patent Application No. 60/735,438, filed in the German language on Nov. 10, 2005, the priorities of which are hereby claimed. Both documents are incorporated into this application in their entireties by reference. An English language translation of the '438 United States Provisional Application was filed on May 26, 2006, the entirety of which is also incorporated herein by reference.

TECHNICAL FIELD

The invention relates to a process of manufacturing ultra high molecular weight polymers via the polymerization and co-polymerization of olefins using catalysts and their catalyst systems.

BACKGROUND OF THE INVENTION

Ultra high molecular weight ethylene polymers refer to those having a viscosimetrically determined molecular weight of greater than $1 \times 10^6$ g/mol. Because of their extraordinary properties, such as higher abrasion resistance and low sliding friction, such polymers have a multitude of uses. Consequently, they are used in materials handling, bulk materials handling, as well as in medical applications such as joint sockets in prosthetic joints.

Because of these novel properties, the processing of ultra high molecular weight polyethylene is highly complex. Ram-extrusion and compression molding of powdered raw materials are processes used to produce molded parts, whereby the molded parts manufactured often still exhibit the characteristics of the raw powder. Films and fibers are produced using solution or gel processes, which require large amounts of solvents. An objective is therefore to develop new ultra high molecular weight polyethylenes, which have improved processability.

According to the present state of technology, ultra high molecular weight polyethylene is manufactured according to the low pressure process using heterogeneous Ziegler catalysts. Such catalysts are, for example, described in the following patent documents: EP186995, DE3833445, EP575840 and U.S. Pat. No. 6,559,249.

Other known catalysts for olefin polymerization are single site catalysts. According to the present state of technology, ultra high molecular weight polymers are manufactured using these catalysts only in exceptional cases and under economically unprofitable conditions. Consequently, heterogeneous constrained-geometry catalysts form ultra high molecular weight polyethylene only with moderate activity and increased long chain branching, which can lead to reduced hardness and worse abrasion properties. With so-called phenoxy-imine catalysts, UHMWPE is obtained only at low activity at economically unprofitable temperature levels. Examples of these as well as other metallocenes are described in WO9719959, WO0155231, Adv. Synth. Catal 2002, 344, 477-493, EP0798306 as well as in EP0643078.

Surprisingly, bridged single site catalysts with a suitable ligand structure were found in connection with the present invention, which when optionally used with aluminoxanes as co-catalysts, not only permitted the manufacture of ultra high molecular weight polyethylenes with a viscosimetrically determined molecular weight of greater than $1 \times 10^6$ g/mol, but also produced products with improved processability. The reason for the improved processability, without being bound to a theory, has to do with the narrower molecular weight distribution Mw/Mn of 2 to 6 compared to polymers that were manufactured using Ziegler catalysts and have a molecular weight distribution Mw/Mn of 3 to 30.

SUMMARY OF THE INVENTION

According to one aspect of the present invention, there is provided a novel process for manufacturing ultra high molecular weight polymers using a catalyst system which includes bridged metallocene catalysts of the type having the following general formula:

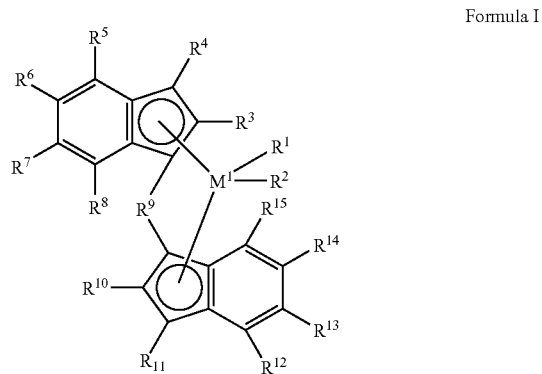

Formula I whereby:

$M^1$ is a transition metal of the $3^{rd}$ to $6^{th}$ group of the periodic table, whose oxidation level does not equal zero, and is preferably Ti, Zr, Hf, V, Mo, Sc, Y, Cr and Nb; and $R^1$ is hydrogen or a $C_1$-$C_{20}$-carbonaceous group or a halogen atom; and $R^2$ is hydrogen or a $C_1$-$C_{20}$ carbonaceous group or a halogen atom; and $R^3$, $R^{10}$ are each identical or different and are each a $C_1$-$C_{20}$ carbonaceous group, provided that at least one radical $R^3$ or $R^{10}$ is a $C_2$-$C_{20}$ carbonaceous group; and $R^4$, $R^5$, $R^6$, $R^7$, $R^8$, $R^{11}$, $R^{12}$, $R^{13}$, $R^{14}$, $R^{15}$ are each identical or different and are each hydrogen or a halogen atom or a $C_1$-$C_{20}$ carbonaceous group, whereby, optionally, two or more consecutively form a cyclic system, and preferably at least one includes a cyclic group; and $R^9$ forms a bridge between the ligands, which can be shown by the following formulas:

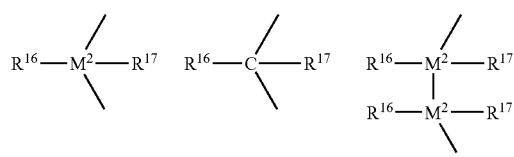

-continued

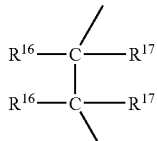

whereby:

$M^2$ is either silicon, germanium or tin; and $R^{16}$, $R^{17}$ are each identical or different and equal to hydrogen or a $C_1$-$C_{20}$ carbonaceous group or a halogen atom.

Still further features and advantages of the invention are apparent from the following description.

DETAILED DESCRIPTION OF THE INVENTION

The process according to the invention also contradicts the prejudice that the economical manufacture of ultra high molecular weight polymers is impossible using aluminoxanes as co-catalysts. Through the novel ligand structure of the inventions, the catalyst is believed to be sterically shielded enough against the primary mechanism for low molecular weight products to result, namely the chain transfer to aluminoxane, without however losing its economically necessary activity to the monomers.

The object of the present invention is a process to manufacture ultra high molecular weight polymers using the compounds of Formula I:

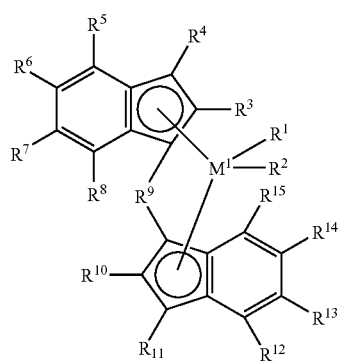

Formula I whereby:

$M^1$ is a transition metal of the $3^{rd}$ to $6^{th}$ group of the periodic table, whose oxidation level does not equal zero, and is preferably Ti, Zr, Hf, V, Mo, Sc, Yu, Cr and Nb; and $R^1$ is hydrogen or a $C_1$-$C_{20}$-carbonaceous group or a halogen atom; and $R^2$ is hydrogen or a $C_1$-$C_{20}$ carbonaceous group or a halogen atom; and $R^3$, $R^{10}$ are each identical or different and are each a $C_1$-$C_{20}$ carbonaceous group, provided that at least one radical $R^3$ or $R^{10}$ is a $C_2$-$C_{20}$ carbonaceous group; and $R^4$, $R^5$, $R^6$, $R^7$, $R^8$, $R^{11}$, $R^{12}$, $R^{13}$, $R^{14}$, $R^{15}$ are each identical or different and are each hydrogen or a halogen atom or a $C_1$-$C_{20}$ carbonaceous group, whereby, optionally, two or more consecutively form a cyclic system, and preferably at least one includes a cyclic group; and $R^9$ forms a bridge between the ligands, which can be shown by the following formulas:

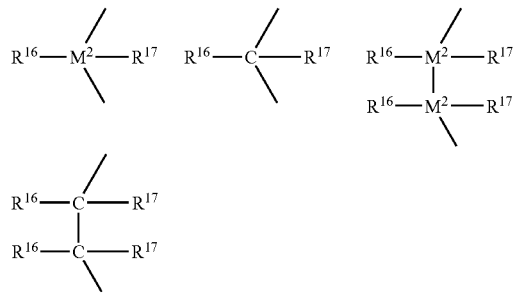

whereby:

$M^2$ is either silicon, germanium or tin; and $R^{16}$, $R^{17}$ are each identical or different and equal to hydrogen or a $C_1$-$C_{20}$ carbonaceous group or a halogen atom.

In the present invention, a $C_1$-$C_{20}$ carbonaceous group is understood to be preferably the radicals $C_1$-$C_{20}$-alkyl, in particular methyl, ethyl, n-propyl, i-propyl, n-butyl, i-butyl, s-butyl, t-butyl, n-pentyl, s-pentyl, cyclopentyl, n-hexyl, cyclohexyl, n-octyl, or cyclooctyl, $C_1$-$C_{20}$ alkenyl, in particular ethenyl, propenyl, butenyl, pentenyl, cyclopentenyl, hexenyl, cyclohexenyl, octenyl or cyclooctenyl, $C_1$-$C_{20}$ alkinyl, in particular ethinyl, propinyl, butinyl, pentinyl, hexinyl or octinyl, $C_6$-$C_{20}$ aryl, in particular benzylidene, o-methoxybenzylidene, 2,6-dimethylbenzylidene, phenyl, biphenyl, naphthyl, anthracenyl, triphenylenyl, [1,1',3',1"]-terphenyl-2'-yl, binaphthyl, or phenanthrenyl, $C_1$-$C_{20}$ fluoroalkyl, in particular, trifluoromethyl, pentafluoroethyl or 2,2,2-trifluoroethyl, $C_6$-$C_{20}$ fluoroaryl, in particular pentafluorophenyl, 3,5-bistrifluoromethylphenyl, pentafluorobenzylidene, 3,5-bistrifluoromethylbenzylidene, tetrafluorophenyl, or heptafluoronaphthyl, $C_1$-$C_{20}$ alkoxy, in particular methoxy, ethoxy, n-propoxy, i-propoxy, n-butoxy, i-butoxy, s-butoxy, or t-butoxy, $C_6$-$C_{20}$ aryloxy, in particular phenoxy, naphthoxy, biphenyloxy, anthracenyloxy, phenanthrenyloxy, $C_7$-$C_{20}$ arylalkyl, in particular o-tolyl, m-tolyl, p-tolyl, 2,6-dimethylphenyl, 2,6-diethylphenyl, 2,6-di-1-propylphenyl, 2,6-di-t-butylphenyl, o-t-butylphenyl, m-t-butylphenyl, p-t-butylphenyl, $C_7$-$C_{20}$ alkylaryl, in particular benzyl, ethylphenyl, propylphenyl, diphenylmethyl, triphenylmethyl, or methyl naphthalene, $C_7$-$C_{20}$ aryloxyalkyl, in particular o-methoxyphenyl, m-phenoxymethyl, p-phenoxymethyl, $C_{12}$-$C_{20}$ aryloxyaryl, in particular p-phenoxyphenyl, $C_5$-$C_{20}$ heteroaryl, in particular 2-pyridyl, 3-pyridyl, 4-pyridyl, chinolinyl, isochinolinyl, acridinyl, benzochinolinyl, or benzoisochinolinyl, $C_4$-$C_{20}$ heterocycloalkyl, in particular furyl, benzofuryl, 2-pyrrolidinyl, 2-indolyl, 3-indolyl, 2,3-dihydroindolyl, $C_8$-$C_{20}$ arylalkenyl, in particular o-vinylphenyl, m-vinylphenyl, p-vinylphenyl, $C_8$-$C_{20}$ arylalkinyl, in particular o-ethynylphenyl, m-ethynylphenyl, or p-ethynylphenyl, $C_2$-$C_{20}$ heteroatomic group, in particular carbonyl, benzoyl, oxybenzoyl, benzoyloxy, acetyl, acetoxy, or nitrile, whereby one or more $C_1$-$C_{20}$ carbonaceous groups can form a cyclic system.

In the present invention, a $C_2$-$C_{20}$ carbonaceous group is understood to be preferably the radicals $C_2$-$C_{20}$ alkyl, in particular ethyl, n-propyl, i-propyl, n-butyl, i-butyl, s-butyl, t-butyl, n-pentyl, s-pentyl, cyclopentyl, n-hexyl, cyclohexyl, n-octyl, or cyclooctyl, $C_2$-$C_{20}$ alkenyl, in particular ethenyl, propenyl, butenyl, pentenyl, cyclopentenyl, hexenyl, cyclohexenyl, octenyl or cyclooctenyl, $C_2$-$C_{20}$ alkinyl, in particular ethinyl, propinyl, butinyl, pentinyl, hexinyl or octinyl, $C_6$-$C_{20}$ aryl, in particular benzylidene, o-methoxybenzylidene, 2,6-dimethylbenzylidene, phenyl, biphenyl, naphthyl, anthracenyl, triphenylenyl, [1,1',3',1"]-terphenyl-2'-yl, binaphthyl, or phenanthrenyl, $C_2$-$C_{20}$ fluoroalkyl, in particular, 3-trifluoropropyl, 2,2'-trifluoroisopropyl, $C_6$-$C_{20}$ fluoroaryl, in particular pentafluorophenyl, 3,5-bistrifluoromethylphenyl, pentafluorobenzylidine, 3,5-bistrifluoromethylbenzylidine, tetrafluorophenyl or heptafluoronaphthyl, $C_2$-$C_{20}$ alkoxy, in particular n-propoxy, i-propoxy, n-butoxy, i-butoxy, s-butoxy, or t-butoxy, $C_6$-$C_{20}$ aryloxy, in particular phenoxy, naphthoxy, biphenyloxy, anthracenyloxy, phenanthrenyloxy, $C_7$-$C_{20}$ arylalkyl, in particular o-tolyl, m-tolyl, p-tolyl, 2,6-dimethylphenyl, 2,6-diethylphenyl, 2,6-di-1-propylphenyl, 2,6-di-t-butylphenyl, o-t-butylphenyl, m-t-butylphenyl, p-t-butylphenyl, $C_7$-$C_{20}$ alkylaryl, in particular benzyl, ethylphenyl, propylphenyl, diphenylmethyl, triphenylmethyl, or methyl naphthalene, $C_7$-$C_{20}$ aryloxyalkyl, in particular o-methoxyphenyl, m-phenoxymethyl, p-phenoxymethyl, $C_{12}$-$C_{20}$ aryloxyaryl, in particular p-phenoxyphenyl, $C_5$-$C_{20}$ heteroaryl, in particular 2-pyridyl, 3-pyridyl, 4-pyridyl, chinolinyl, isochinolinyl, acridinyl, benzochinolinyl, or benzoisochinolinyl, $C_4$-$C_{20}$ heterocycloalkyl, in particular furyl, benzofuryl, 2-pyrrolidinyl, 2-indolyl, 3-indolyl, 2,3-dihydroindolyl, $C_8$-$C_{20}$ arylalkenyl, in particular o-vinylphenyl, m-vinylphenyl, p-vinylphenyl, $C_8$-$C_{20}$ arylalkinyl, in particular o-ethynylphenyl, m-ethynylphenyl, or p-ethynylphenyl, $C_2$-$C_{20}$ heteroatomic group, in particular benzoyl, oxybenzoyl, benzoyloxy, whereby one or more $C_2$-$C_{20}$ carbon containing groups includes a cyclic group.

In a preferred embodiment of the invention, for Formula I:

$M^1$ shall be a transition metal of the $4^{th}$ group of the periodic table, whose oxidation level does not equal zero, and is preferably Ti, Zr or Hf; and $R^1$ shall be hydrogen or a $C_1$-$C_{20}$-carbonaceous group or a halogen atom; and $R^2$ shall be hydrogen or a $C_1$-$C_{20}$ carbonaceous group or a halogen atom; and $R^3$ shall be a $C_2$-$C_{20}$ carbonaceous group, preferably one cyclized in an α- or β-position or one in an α- or β-position branched carbonaceous group; and $R^{10}$ shall be a $C_1$-$C_{10}$ carbonaceous group; and $R^4, R^6, R^7, R^8, R^{10}, R^{11}, R^{13}, R^{14}, R^{15}$ shall each be equal to hydrogen; and $R^5, R^{12}$ shall each be identical or different and shall be a $C_1$-$C_{20}$ carbonaceous group, where, preferably one or both contain a cyclic group such as those enumerated above; and $R^9$ shall form a bridge between the ligands, which can be shown by the following formulas:

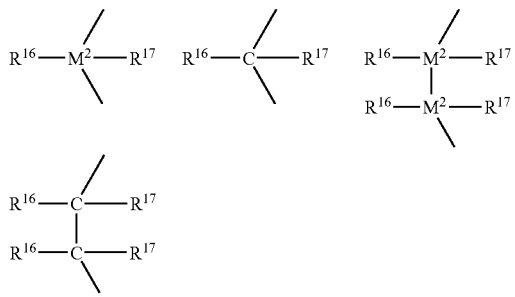

whereby:

$M^2$ is silicon; and $R^{16}, R^{17}$ are each identical or different and are each hydrogen or a $C_1$-$C_{20}$ carbonaceous group or a halogen atom.

In another embodiment of the invention, for Formula I:

$M^1$ shall be zirconium; and $R^1, R^2$ shall be equal and stand for chlorine, methyl or phenolate; and $R^3$ shall be an isopropyl-, isobutyl-, cyclopentyl-, cyclohexyl-, tert-butyl-, or a phenyl group; and $R^{10}$ shall be a $C_1$-$C_6$ carbonaceous alkyl group; and $R^4, R^6, R^7, R^8, R^{10}, R^{11}, R^{13}, R^{14}, R^{15}$ shall each be hydrogen; and $R^5, R^{12}$ shall be identical and include a phenyl group which supports a $C_1$-$C_4$ alkyl group, preferably in the para-position; and $R^9$ shall form a bridge between the ligands, which can be shown by the following formulas:

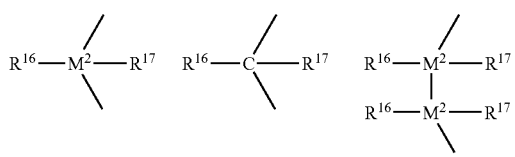

-continued

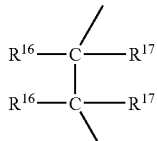

whereby:

$M^2$ is silicon; and $R^{16}$, $R^{17}$ are each identical or different and are hydrogen or a $C_1$-$C_{20}$ carbonaceous group or a halogen atom.

Illustrative but non-limiting examples for compounds of Formula I are:

Dimethylsilandiyl-(2-isopropyl-4-(p-isopropyl-phenyl)indenyl)(2-methyl-4-(p-isopropyl-phenyl)indenyl)-zirconium dichloride,
Dimethylsilandiyl-(2-isopropyl-4-(p-tert.-butyl-phenyl)indenyl)(2-methyl-4-(p-tert.-butyl-phenyl)indenyl)-zirconium dichloride,
Dimethylsilandiyl-(2-isopropyl-4-(p-tert.-butyl-phenyl)indenyl)(2,7-dimethyl-4-(p-tert.-butyl-phenyl)indenyl)-zirconium dichloride,
Dimethylsilandiyl-(2-isopropyl-4-(p-tert.-butyl-phenyl)indenyl)(2,5,6,7-tetramethyl-4-(p-tert.-butyl-phenyl)indenyl)-zirconium dichloride,
Dimethylsilandiyl-(2-isopropyl-6-methyl-4-(p-tert.-butyl-phenyl)indenyl)(2,6-dimethyl-4-(p-tert.-butyl-phenyl)indenyl)-zirconium dichloride,
Dimethylsilandiyl-(2-isopropyl-4-(p-sec.-butyl-phenyl)indenyl)(2-methyl-4-(p-sec.butyl-phenyl)indenyl)-zirconium dichloride,
Dimethylsilandiyl-(2-isopropyl-4-(p-cyclohexyl-phenyl)indenyl)(2-methyl-4-(p-cyclohexyl-phenyl)indenyl)-zirconium dichloride,
Dimethylsilandiyl-(2-isopropyl-4-(p-trimethylsilyl-phenyl)indenyl)(2-methyl-4-(p-trimethylsilyl-phenyl)indenyl)-zirconium dichloride,
Dimethylsilandiyl-(2-isopropyl-4-(p-adamantyl-phenyl)indenyl)(2-methyl-4-(p-adamantyl-phenyl)indenyl)-zirconium dichloride,
Dimethylsilandiyl-(2-isopropyl-4-(p-tris(trifluoromethyl)methyl-phenyl)indenyl)(2-methyl-4-(p-tris(trifluoromethyl)methyl-phenyl)indenyl)-zirconium dichloride,
Dimethylsilandiyl-(2-isopropyl-4-phenyl-indenyl)(2-methyl-4-(p-tert.-butyl-phenyl)indenyl)-zirconium dichloride,
Dimethylsilandiyl-(2-isopropyl-4-(p-tert.-butyl-phenyl)indenyl)(2-methyl-4-phenyl-indenyl)-zirconium dichloride,
Dimethylsilandiyl-(2-isopropyl-4-(p-tert-butyl-phenyl)indenyl)(2,7-dimethyl-4-phenyl-indenyl)-zirconium dichloride,
Dimethylsilandiyl-(2-isopropyl-4-(p-tert.-butyl-phenyl)indenyl)(2,5,6,7-tetramethyl-4-phenyl-indenyl)-zirconium dichloride,
Dimethylsilandiyl-(2-isopropyl-6-methyl-4-(p-tert.-butyl-phenyl)indenyl)(2,6-dimethyl-4-phenyl-indenyl)-zirconium dichloride,
Dimethylsilandiyl-(2-isopropyl-4-phenyl-indenyl)(2,7-dimethyl-4-(p-tert.-butyl-phenyl)indenyl)-zirconium dichloride,
Dimethylsilandiyl-(2-isopropyl-4-phenyl-indenyl)(2,5,6,7-tetramethyl-4-(p-tert.-butyl-phenyl)indenyl)-zirconium dichloride,
Dimethylsilandiyl-(2-isopropyl-6-methyl-4-phenyl-indenyl)(2,6-dimethyl-4-(p-tert.-butyl-phenyl)indenyl)-zirconium dichloride,
Dimethylsilandiyl-(2-isopropyl-4-(p-tert.-butyl-phenyl)indenyl)(2-methyl-4-(4-naphthyl)-indenyl)indenyl)-zirconium dichloride,
Dimethylsilandiyl-(2-isopropyl-4-(4-naphthyl)-indenyl)(2-methyl-4-(p-tert.-butyl-phenyl)indenyl)-zirconium dichloride,
Dimethylsilandiyl-bis(2-isopropyl-[4,5]-benzo-indenyl)zirconium dichloride,
Dimethylsilandiyl-bis(2-isopropyl-indenyl)zirconium dichloride,
Dimethylsilandiyl-bis(2-isopropyl-4-(1-naphthyl)-indenyl)zirconium dichloride, Dimethylsilandiyl-bis(2-isopropyl-4-(2-naphthyl)-indenyl)zirconium dichloride,
Dimethylsilandiyl-bis(2-isopropyl-4-phenyl-indenyl)zirconium dichloride,
Dimethylsilandiyl-bis(2-isopropyl-4-tert.-butyl-indenyl)zirconium dichloride,
Dimethylsilandiyl-bis(2-isopropyl-4-isopropyl-indenyl)zirconium dichloride,
Dimethylsilandiyl-bis(2-isopropyl-4-ethyl-indenyl)zirconium dichloride,
Dimethylsilandiyl-bis(2-isopropyl-4-acenaphth-indenyl)zirconium dichloride,
Dimethylsilandiyl-bis(2,4-diisopropyl-indenyl)zirconium dichloride,
Dimethylsilandiyl-bis(2-isopropyl-4-methyl-indenyl)zirconium dichloride
Dimethylsilandiyl-bis(2,4,6-triisopropyl-indenyl)zirconium dichloride,
Dimethylsilandiyl-bis(2,4,5-triisopropyl-indenyl)zirconium dichloride,
Dimethylsilandiyl-bis(2-isopropyl-5-isobutyl-indenyl)zirconium dichloride
Dimethylsilandiyl-bis(2-isopropyl-5-t-butyl-indenyl)zirconium dichloride,
Dimethylsilandiyl-bis(2-isopropyl-4-(4'-tert-butyl-phenyl)-indenyl)zirconium dichloride,
Dimethylsilandiyl-bis(2-isopropyl-4-(4'-methyl-phenyl)-indenyl)zirconium dichloride, Dimethylsilandiyl-bis(2-isopropyl-4-(4'-ethyl-phenyl)-indenyl)zirconium dichloride,
Dimethylsilandiyl-bis(2-isopropyl-4-(4'-trifluoromethyl-phenyl)-indenyl)zirconium dichloride,
Dimethylsilandiyl-bis(2-isopropyl-4-(4'-methoxy-phenyl)-indenyl)zirconium dichloride, Dimethylsilandiyl-bis(2-isopropyl-4-(4'-tert-butyl-phenyl)-indenyl)zirconium dimethyl, Dimethylsilandiyl-bis(2-isopropyl-4-(4'-methyl-phenyl)-indenyl)zirconium dimethyl,
Dimethylsilandiyl-bis(2-isopropyl-4-(4'-ethyl-phenyl)-indenyl)zirconium dimethyl,
Dimethylsilandiyl-bis(2-isopropyl-4-(4'-trifluoromethyl-phenyl)indenyl)zirconium dimethyl,
Dimethylsilandiyl-bis(2-isopropyl-4-(4'-methoxy-phenyl)-indenyl)zirconium dimethyl, Dimethylsilandiyl-bis(2-isopropyl-4-(4'-tert.-butyl-phenyl)-indenyl)hafnium dichloride,
Dimethylsilandiyl-bis(2-isopropyl-4-(4'-tert.-butyl-phenyl)-indenyl)titanium dichloride,
Dimethylsilandiyl-bis(2-isopropyl-4-(4'-n-propyl-phenyl)-indenyl)zirconium dichloride, Dimethylsilandiyl-bis(2-isopropyl-4-(4'-n-butyl-phenyl)-indenyl)zirconium dichloride, Dimethylsilandiyl-bis(2-isopropyl-4-(4'-hexyl-phenyl)-indenyl)zirconium dichloride, Dimethylsilandiyl-bis(2-isopropyl-4-(4'-sec-butyl-phenyl)-indenyl)zirconium dichloride,
Dimethylsilandiyl-bis(2-isopropyl-4-(4'-methyl-phenyl)-indenyl)zirconium dichloride,
Dimethylsilandiyl-bis(2-isopropyl-4-(4'-ethyl-phenyl)-indenyl)zirconium dichloride, Dimethylsilandiyl-bis(2-isopropyl-4-(4'-n-propyl-phenyl)-indenyl)zirconium dichloride, Dimethylsilandiyl-bis(2-isopropyl-4-(4'-n-butyl-phenyl)-indenyl)zirconium dichloride,
Dimethylsilandiyl-bis(2-isopropyl-4-(4'-hexyl-phenyl)-indenyl)zirconium dichloride,
Dimethylsilandiyl-bis(2-isopropyl-4-(4'-pentyl-phenyl)-indenyl)zirconium dichloride,
Dimethylsilandiyl-bis(2-isopropyl-4-(4'-cyclohexyl-phenyl)-indenyl)zirconium dichloride, Dimethylsilandiyl-bis(2-isopropyl-4-(4'-sec-butyl-phenyl)-indenyl)zirconium dichloride, Dimethylsilandiyl-bis(2-isopropyl-4-(4'-tert.-butyl-phenyl)-indenyl)zirconium dichloride,
Dimethylsilandiyl-bis(2-n-propyl-4-phenyl-indenyl)zirconium dichloride,
Dimethylsilandiyl-bis(2-n-propyl-4-(4'-methyl-phenyl)-indenyl)zirconium dichloride,
Dimethylsilandiyl-bis(2-n-propyl-4-(4'-ethyl-phenyl)-indenyl)zirconium dichloride,
Dimethylsilandiyl-bis(2-n-propyl-4-(4'-iso-propyl-phenyl)-indenyl)zirconium dichloride,
Dimethylsilandiyl-bis(2-n-propyl-4-(4'-n-butyl-phenyl)-indenyl)zirconium dichloride, Dimethylsilandiyl-bis(2-n-propyl-4-(4'-hexyl-phenyl)-indenyl)zirconium dichloride,
Dimethylsilandiyl-bis(2-n-propyl-4-(4'-cyclohexyl-phenyl)-indenyl)zirconium dichloride,
Dimethylsilandiyl-bis(2-n-propyl-4-(4'-sec-butyl-phenyl)-indenyl)zirconium dichloride, Dimethylsilandiyl-bis(2-n-propyl-4-(4'-tert.-butyl-phenyl)-indenyl)zirconium dichloride, Dimethylsilandiyl-bis(2-n-butyl-4-phenyl-indenyl)zirconium dichloride,
Dimethylsilandiyl-bis(2-n-butyl-4-(4'-methyl-phenyl)-indenyl)zirconium dichloride,
Dimethylsilandiyl-bis(2-n-butyl-4-(4'-ethyl-phenyl)-indenyl)zirconium dichloride,
Dimethylsilandiyl-bis(2-n-butyl-4-(4'-n-propyl-phenyl)-indenyl)zirconium dichloride, Dimethylsilandiyl-bis(2-n-butyl-4-(4'-iso-propyl-phenyl)-indenyl)zirconium dichloride, Dimethylsilandiyl-bis(2-n-butyl-4-(4'-n-butyl-phenyl)-indenyl)zirconium dichloride,
Dimethylsilandiyl-bis(2-n-butyl-4-(4'-hexyl-phenyl)-indenyl)zirconium dichloride,
Dimethylsilandiyl-bis(2-n-butyl-4-(4'-cyclohexyl-phenyl)-indenyl)zirconium dichloride, Dimethylsilandiyl-bis(2-n-butyl-4-(4'-sec-butyl-phenyl)-indenyl)zirconium dichloride, Dimethylsilandiyl-bis(2-n-butyl-4-(4'-tert.-butyl-phenyl)-indenyl)zirconium dichloride, Dimethylsilandiyl-bis(2-hexyl-4-phenyl-indenyl)zirconium dichloride,
Dimethylsilandiyl-bis(2-hexyl-4-(4'-methyl-phenyl)-indenyl)zirconium dichloride,
Dimethylsilandiyl-bis(2-hexyl-4-(4'-ethyl-phenyl)-indenyl)zirconium dichloride,
Dimethylsilandiyl-bis(2-hexyl-4-(4'-n-propyl-phenyl)-indenyl)zirconium dichloride, Dimethylsilandiyl-bis(2-hexyl-4-(4'-iso-propyl-phenyl)-indenyl)zirconium dichloride, Dimethylsilandiyl-bis(2-hexyl-4-(4'-n-butyl-phenyl)-indenyl)zirconium dichloride,
Dimethylsilandiyl-bis(2-hexyl-4-(4'-n-hexyl-phenyl)-indenyl)zirconium dichloride,
Dimethylsilandiyl-bis(2-hexyl-4-(4'-cyclohexyl-phenyl)-indenyl)zirconium dichloride, Dimethylsilandiyl-bis(2-hexyl-4-(4'-sec-butyl-phenyl)-indenyl)zirconium dichloride, Dimethylsilandiyl-bis(2-hexyl-4-(4'-tert.-butyl-phenyl)-indenyl)zirconium dichloride, Dimethylsilandiyl-bis(2-phenyl-4-phenyl-indenyl)zirconium dichloride,
Dimethylsilandiyl-bis(2-phenyl-4-(4'-methyl-phenyl)-indenyl)zirconium dichloride,
Dimethylsilandiyl-bis(2-phenyl-4-(4'-ethyl-phenyl)-indenyl)zirconium dichloride,
Dimethylsilandiyl-bis(2-phenyl-4-(4'-n-propyl-phenyl)-indenyl)zirconium dichloride, Dimethylsilandiyl-bis(2-phenyl-4-(4'-iso-propyl-phenyl)-indenyl)zirconium dichloride, Dimethylsilandiyl-bis(2-phenyl-4-(4'-n-butyl-phenyl)-indenyl)zirconium dichloride,
Dimethylsilandiyl-bis(2-phenyl-4-(4'-n-hexyl-phenyl)-indenyl)zirconium dichloride,
Dimethylsilandiyl-bis(2-phenyl-4-(4'-cyclohexyl-phenyl)-indenyl)zirconium dichloride, Dimethylsilandiyl-bis(2-phenyl-4-(4'-sec-butyl-phenyl)-indenyl)zirconium dichloride, Dimethylsilandiyl-bis(2-phenyl-4-(4'-tert.-butyl-phenyl)-indenyl)zirconium dichloride,
Dimethylsilandiyl-bis(2-isopropyl-4-(4'-tert.-butyl-phenyl)-indenyl)zirconiumbis(dimethylamine),
Dimethylsilandiyl-bis(2-isopropyl-4-(4'-tert.-butyl-phenyl)-indenyl)zirconium dibenzyl, Dimethylsilandiyl-bis(2-ethyl-4-(4'-tert.-butyl-phenyl)-indenyl)zirconium dichloride,
Dimethylsilandiyl-bis(2-isopropyl-4-(4'-tert.-butyl-phenyl)-indenyl)zirconium dimethyl,
Dimethylsilandiyl-(2-methyl-4-azapentalene)(2-isopropyl-4-(4'-methyl-phenyl)-indenyl)zirconium dichloride,
Dimethylsilandiyl-(2-methyl-5-azapentalene)(2-isopropyl-4-(4'-methyl-phenyl)-indenyl)zirconium dichloride,
Dimethylsilandiyl-(2-methyl-6-azapentalene)(2-isopropyl-4-(4'-methyl-phenyl)-indenyl)zirconium dichloride,
Dimethylsilandiyl-(2-methyl-4-azapentalene)(2-isopropyl-4-(4'-ethyl-phenyl)indenyl)zirconium dichloride,
Dimethylsilandiyl-(2-methyl-4-thiapentalene)(2-isopropyl-4-(4'-n-propyl-phenyl)-indenyl)zirconium dichloride,
Dimethylsilandiyl-(2-methyl-4-azapentalene)(2-isopropyl-4-(4'-isopropyl-phenyl)-indenyl)zirconium dichloride,
Dimethylsilandiyl-(2-methyl-6-azapentalene)(2-isopropyl-4-(4'-isopropyl-phenyl)-indenyl)zirconium dichloride,
Dimethylsilandiyl-(2,5-dimethyl-6-thiapentalene)(2-isopropyl-4-(4'-isopropyl-phenyl)-indenyl)-zirconium dichloride,
Dimethylsilandiyl-(2-methyl-6-oxapentalene)(2-isopropyl-4-(4'-isopropyl-phenyl)-indenyl)zirconium dichloride,
Dimethylsilandiyl-(2-methyl-6-azapentalene)(2-isopropyl-4-(4'-n-butyl-phenyl)-indenyl)-zirconium dichloride,
Dimethylsilandiyl-(2-methyl-5-thiapentalene)(2-isopropyl-4-(4'-n-butyl-phenyl)-indenyl)zirconium dichloride,
Dimethylsilandiyl-(2-methyl-4-oxapentalene)(2-isopropyl-4-(4'-n-butyl-phenyl)-indenyl)zirconium dichloride,
Dimethylsilandiyl-(2-methyl-4-thiapentalene)(2-isopropyl-4-(4'-s-butyl-phenyl)-indenyl)zirconium dichloride,
Dimethylsilandiyl-(2-methyl-4-oxapentalene)(2-isopropyl-4-(4'-s-butyl-phenyl)-indenyl)zirconium dichloride,
Dimethylsilandiyl-(2-methyl-4-azapentalene)(2-isopropyl-4-(4'-tert.-butyl-phenyl)-indenyl)-zirconium dichloride,
Dimethylsilandiyl-(2-methyl-6-azapentalene)(2-isopropyl-4-(4'-tert.-butyl-phenyl)-indenyl)-zirconium dichloride,
Dimethylsilandiyl-(2-methyl-4-azapentalene)(2-isopropyl-4-(4'-n-pentyl-phenyl)-indenyl)-zirconium dichloride, Dimethylsilandiyl-(2-methyl-N-phenyl-6-azapentalene)(2-isopropyl-4-(4'-n-pentyl-phenyl)-indenyl)-zirconium dichloride,
Dimethylsilandiyl-(2-methyl-4-oxapentalene)(2-isopropyl-4-(4'-n-pentyl-phenyl)-indenyl)zirconium dichloride,
Dimethylsilandiyl-(2-methyl-4-azapentalene)(2-isopropyl-4-(4'-n-hexyl-phenyl)-indenyl) zirconium dichloride,
Dimethylsilandiyl-(2-methyl-4-thiapentalene)(2-isopropyl-4-(4'-n-hexyl-phenyl)-indenyl) zirconium dichloride,
Dimethylsilandiyl-(2-methyl-6-thiapentalene)(2-isopropyl-4-(4'-n-hexyl-phenyl)-indenyl) zirconium dichloride,
Dimethylsilandiyl-(2,5-Dimethyl-4-thiapentalene)(2-isopropyl-4-(4'-n-hexyl-phenyl)-indenyl)-zirconium dichloride,
Dimethylsilandiyl-(2,5-Dimethyl-6-thiapentalene)(2-isopropyl-4-(4'-n-hexyl-phenyl)-indenyl)-zirconium dichloride,
Dimethylsilandiyl-(2,5-dimethyl-6-thiapentalene)(2-isopropyl-4-(4'-cyclohexyl-phenyl)-indenyl)-zirconium dichloride,
Dimethylsilandiyl-(2-methyl-4-azapentalene)(2-isopropyl-4-(4'-trimethylsilyl-phenyl)-indenyl)-zirconium dichloride,
Dimethylsilandiyl-(2-methyl-4-thiapentalene)(2-isopropyl-4-(4'-tri methylsilyl-phenyl)-indenyl)-zirconium dichloride,
Dimethylsilandiyl-(2-methyl-5-thiapentalene)(2-isopropyl-4-(4'-trimethylsilyl-phenyl)-indenyl)-zirconium dichloride,
Dimethylsilandiyl-(2-methyl-6-thiapentalene)(2-isopropyl-4-(4'-trimethylsilyl-phenyl)-indenyl)-zirconium dichloride,
Dimethylsilandiyl-(2,5-Dimethyl-4-azapentalene)(2-isopropyl-4-(4'-adamantyl-phenyl)-indenyl)-zirconium dichloride,
Dimethylsilandiyl-(2-methyl-4-thiapentalene)(2-isopropyl-4-(4'-adamantyl-phenyl)-indenyl)-zirconium dichloride,
Dimethylsilandiyl-(2-methyl-6-thiapentalene)(2-isopropyl-4-(4'-adamantyl-phenyl)-indenyl)-zirconium dichloride,
Dimethylsilandiyl-(2,5-dimethyl-4-thiapentalene)(2-isopropyl-4-(4'-adamantyl-phenyl)-indenyl)-zirconium dichloride,
Dimethylsilandiyl-(2-methyl-4-azapentalene)(2-isopropyl-4-(4'-tris(trifluoromethyl)-methyl-phenyl)-indenyl)-zirconium dichloride,
Dimethylsilandiyl-(2,5-Dimethyl-4-azapentalene)(2-isopropyl-4-(4'-tris(trifluoromethyl)methyl-phenyl)-indenyl)-zirconium dichloride,
Dimethylsilandiyl-(2-methyl-4-thiapentalene)(2-isopropyl-4-(4'-tris(trifluoromethyl)methyl-phenyl)-indenyl)-zirconium dichloride,
Dimethylsilandiyl-(2-methyl-6-thiapentalene)(2-isopropyl-4-(4'-tris(trifluoromethyl)-methyl-phenyl)-indenyl)-zirconium dichloride,
Dimethylsilandiyl-(2-methyl-N-phenyl-6-azapentalene)(2-isopropyl-4-(4'-tert-butyl-phenyl)-indenyl)-zirconium dichloride,
Dimethylsilandiyl-(2-methyl-4-azapentalene)(2-isopropyl-indenyl)zirconium dichloride,
Dimethylsilandiyl-(2-methyl-N-phenyl-4-azapentalene)(2-isopropylindenyl)-zirconium dichloride,
Dimethylsilandiyl-(2-methyl-4-thiapentalene)(2-isopropyl-indenyl)zirconium dichloride, Dimethylsilandiyl-(2-methyl-5-thiapentalene)(2-isopropylindenyl)zirconium dichloride,
Dimethylsilandiyl-(2-methyl-6-thiapentalene)(2-isopropyl-indenyl)zirconium dichloride,
Dimethylsilandiyl-(2-methyl-4-azapentalene)(2-isopropyl-4-phenyl-indenyl)-zirconium dichloride,
Dimethylsilandiyl-(2-methyl-5-azapentalene)(2-isopropyl-4-phenyl-indenyl)-zirconium dichloride,
Dimethylsilandiyl-(2-methyl-6-azapentalene)(2-isopropyl-4-phenyl-indenyl)-zirconium dichloride,
Dimethylsilandiyl-(2-methyl-N-phenyl-4-azapentalene)(2-isopropyl-4-phenyl-indenyl)-zirconium dichloride,
Dimethylsilandiyl-(2-methyl-N-phenyl-5-azapentalene)(2-isopropyl-4-phenyl-indenyl)-zirconium dichloride,
Dimethylsilandiyl-(2-methyl-4-thiapentalene)(2-isopropyl-4-phenyl-indenyl)-zirconium dichloride,
Dimethylsilandiyl-(2-methyl-5-thiapentalene)(2-isopropyl-4-phenyl-indenyl)-zirconium dichloride,
Dimethylsilandiyl-(2-methyl-6-thiapentalene)(2-isopropyl-4-phenyl-indenyl)-zirconium dichloride,
Dimethylsilandiyl-(2-methyl-4-oxapentalene)(2-isopropyl-4-phenyl-indenyl)-zirconium dichloride,
Dimethylsilandiyl-(2-methyl-4-azapentalene)(2-isopropyl-4,5-benzo-indenyl)-zirconium dichloride,
Dimethylsilandiyl-(2-methyl-N-phenyl-4-azapentalene)(2-isopropyl-4,5-benzo-indenyl)-zirconium dichloride,
Dimethylsilandiyl-(2-methyl-N-phenyl-5-azapentalene)(2-isopropyl-4,5-benzo-indenyl)-zirconium dichloride,
Dimethylsilandiyl-(2-methyl-N-phenyl-6-azapentalene)(2-isopropyl-4,5-benzo-indenyl)-zirconium dichloride,
Dimethylsilandiyl-(2-methyl-4-thiapentalene)(2-isopropyl-4,5-benzo-indenyl)-zirconium dichloride,
Dimethylsilandiyl-(2-methyl-5-thiapentalene)(2-isopropyl-4,5-benzo-indenyl)-zirconium dichloride,
Dimethylsilandiyl-(2-methyl-6-thiapentalene)(2-isopropyl-4,5-benzo-indenyl)-zirconium dichloride,
Dimethylsilandiyl-(2-methyl-4-oxapentalene)(2-isopropyl-4,5-benzo-indenyl)-zirconium dichloride,
Dimethylsilandiyl-(2-methyl-5-oxapentalene)(2-isopropyl-4,5-benzo-indenyl)-zirconium dichloride,
Dimethylsilandiyl-(2-methyl-6-oxapentalene)(2-isopropyl-4,5-benzo-indenyl)-zirconium dichloride,
Dimethylsilandiyl-bis(2-isopropyl-4-azapentalene)zirconium dichloride,
Dimethylsilandiyl-bis(2-isopropyl-N-phenyl-4-azapentalene)zirconium dichloride, Dimethylsilandiyl-bis(2-isopropyl-4-thiapentalene)zirconium dichloride, as well as the corresponding titanium and hafnium compounds and also various bridges of dimethylsilandiyl according to Formula I such as dimethylmethandiyl, diphenylmethandiyl, ethandiyl, 1,2-dimethylethandiyl, dipropylsilandiyl, dibutylsilandiyl, dipentylsilandiyl, dihexylsilandiyl, diheptylsilandiyl, dioctylsilandiyl, dinonylsilandiyl, didecylsilanediyl, diundecylsilandiyl, didodecylsilandiyl.

The synthesis of the compounds of Formula I according to the invention can be conducted according to processes known to one skilled in the art. An example therefor is set forth in the following schematic.

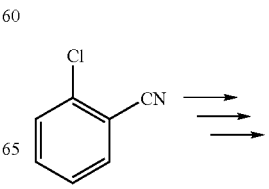

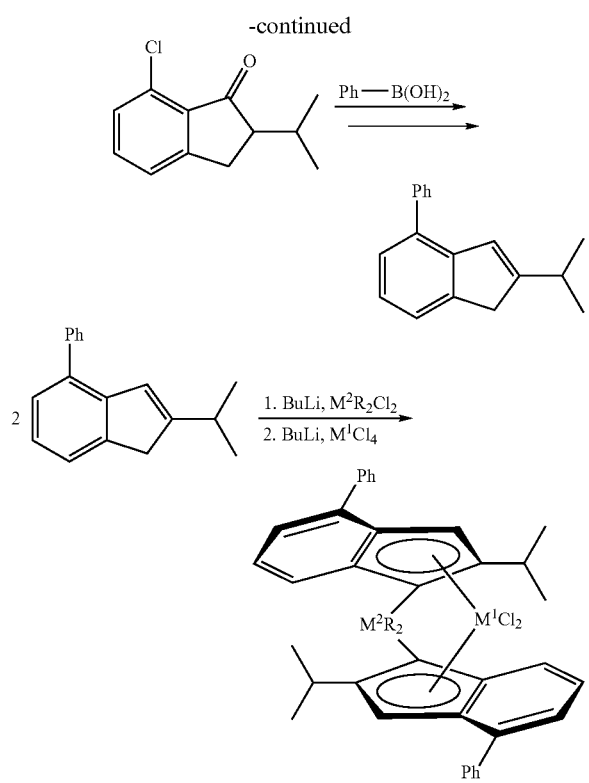

The compounds of Formula I according to the invention are particularly suited to be components of catalyst systems to manufacture polyolefins through the polymerization of at least one olefin in the presence of a catalyst that contains at least one compound of Formula I according to the invention, and optionally at least one co-catalyst.

Ethylene is preferred as the olefin. In a preferred embodiment of the invention, ethylene is polymerized using the catalysts of the invention, whereby polymerization is understood to be both the homo-polymerization of ethylenes as well as the co-polymerization of ethylene with other olefins. The ethylene used in the process can, if desired, contain still other olefins that are selected from the group that is formed by 1-olefin with 2-20, preferably 2 to 10 C atoms, such as propene, 1-butene, 1-pentene, 1-hexene, 1-decene, 4-methyl-1-pentene or 1-octene, styrene, dienes such as 1,3-butadiene, 1,4-hexadiene, vinyl norbornene, norbornadiene, ethyl norbornadiene and cyclo-olefins such as norbornene, cyclopentadiene, tetracyclododecene or methyl norbornenes as well as mixtures of same.

Particular preference is given to co-polymerizing the ethylene used with one or more 1-olefins with 2 to 8 C atoms such as propene, 1-butene, 1-pentene, 1-hexene, styrene or butadiene.

A co-monomer fraction of 0.1 to 10%, is suitable, preferably 0.5 to 9% and in particular 2 to 5%. Particular preference is given to the co-polymerization of ethylene with the co-monomer propene.

Further preference is given to the process according to the invention whereby the ethylene used is homo-polymerized, or co-polymerized with propene.

Particular preference is given to the process according to the invention whereby the ethylene used is homo-polymerized.

The ethylene polymers and co-polymers manufactured with the process according to the invention are ultra high molecular weight, since they have a viscosimetrically determined molecular weight of greater than $1 \times 10^6$ g/mol. Preference is given to polyethylenes with a molecular weight of greater than $1 \times 10^6$ g/mol that can be obtained using the process according to the invention.

The viscosimetric measurements are made in Decalin at 135° C. and a concentration of 0.1 g (polymer)/1 L (Decalin). The molecular weight can be derived from the viscosity number.

The polymerization is conducted at a temperature of −20 to 300° C., preferably 0 to 200° C., most especially preferred at 20 to 100° C. The pressure is from 0.5 to 2000 bar, preferably 1 to 64 bar. The polymerization can be conducted in solution, in bulk, in suspension or in emulsion, continuously or in batches, in one or more stages. Suitable solvents for the polymerization are, for example, aliphatic hydrocarbons such as pentane, hexane and the like or aromatic hydrocarbons such as benzene, toluene, xylene and the like, or ethers such as diethyl ether, dibutyl ether, methyl-tert-butyl ether, tetrahydrofuran, dioxane, anisole, diphenyl ether and ethyl-phenyl ether, as well as halogenated solvents such as dichloromethane, trichloromethane, chloro-benzene, bromobenzene and the like. Mixtures of various solvents in various proportions can also be used according to the invention.

Ultra high molecular weight ethylene polymers and co-polymers are obtained through the polymerization of at least one olefin in the presence of catalyst systems of at least one compound of Formula I and one co-catalyst.

In a preferred embodiment of the invention, the catalyst system used in the process according to the invention contains at least one co-catalyst.

The co-catalyst that, together with at least one transition metal compound of Formula I, forms the catalyst system, contains at least one aluminoxane compound, or another Lewis acid, or an ionic compound, which reacts with the transition metal compound to convert it into a cationic compound.

Particular preference is given to catalyst systems that contain at least one Lewis acid as co-catalyst.

As aluminoxane, preference is given to using a compound of the general Formula II.

(RAlO)q           Formula II

Other suitable aluminoxanes may be cyclic, and can have the structure shown, for example, in Formula III

Formula III or may be linear as in Formula IV

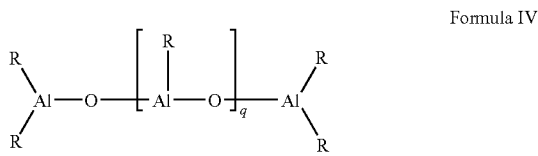
Formula IV or may be of a cluster type as in Formula V.

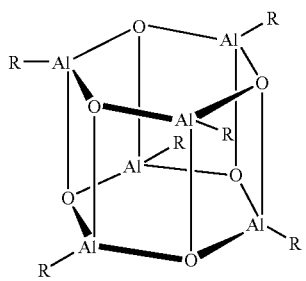

Formula V

Such aluminoxanes are, for example, described in JACS 117 (1995), 6465-74, Organometallics 13 (1994), 2957-2969.

The radical R in the Formulas II, III, IV and V may be identical or different and are each a $C_1$-$C_{20}$-hydrocarbon group such as a $C_1$-$C_6$ alkyl group, a $C_6$-$C_{18}$ aryl group, benzyl or hydrogen, and q stands for an integer of 2 to 50, preferably 10 to 35. Preferably, the radicals R are identical and are each methyl, isobutyl, n-butyl, phenyl or benzyl, in particular methyl.

If the radicals R are different, they are preferably methyl and hydrogen, methyl and isobutyl, or methyl and n-butyl, containing hydrogen or isobutyl or n-butyl preferably up to 0.01-40% (number of radicals R).

The aluminoxane can be manufactured in various ways according to known processes. One of the methods is, for example, reacting an aluminum hydrocarbon compound and/or a hydridoaluminum hydrocarbon compound with water (gaseous, solid, liquid or bound—for example as water of crystallization) in an inert solvent (such as toluene).

To prepare an aluminoxane having different alkyl groups R, two different aluminum trialkyls ($AlR_3$+$AlR'_3$), corresponding to the desired composition and reactivity, are reacted with water (see S. Pasynkiewicz, Polyhedron 9 (1990) 429 and EP-A-0,302,424).

Regardless of the type of preparation, a variable content of unreacted aluminum feed compound, present in free form or as an adduct, is common to all aluminoxane solutions.

As Lewis acid, preference is given to using at least one boron or organoaluminum compound containing $C_1$-$C_{20}$ carbonaceous groups, such as branched or unbranched alkyl or haloalkyl groups, such as methyl, propyl, isopropyl, isobutyl, trifluoromethyl, unsaturated groups such as aryls, or haloaryls, such as phenyl, tolyl, benzene groups, p-fluorophenyl, 3,5-difluorophenyl, pentachlorophenyl, pentafluorophenyl, 3,4,5 trifluorophenyl and 3,5 di(trifluoromethyl)phenyl.

Examples of Lewis acids are trimethylaluminum, triethylaluminum, triisobutylaluminum, tributylaluminum, trifluoroborane, triphenylborane, tris(4-fluorophenyl)borane, tris (3,5-difluorophenyl)borane, tris(4-fluoromethylphenyl) borane, tris(pentafluorophenyl)borane, tris(tolyl)borane, tris (3,5-dimethylphenyl)borane, tris(3,5-difluorophenyl)borane, and/or tris(3,4,5-trifluorophenyl)borane. Particular preference is given to tris(pentafluorophenyl)borane.

As ionic cocatalysts, preference is given to using compounds that contain a noncoordinating anion, such as tetrakis (pentafluorophenyl)-borate, tetraphenylborate, $SbF_6$—, $CF_3SO_3$— or $ClO_4$—.

As cationic counterions, use is made of protonated Lewis bases such as, for example, methyl amine, aniline, N,N-dimethylbenzylamine, as well as their derivatives, N,N-dimethylcyclohexylamine and its derivatives, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triethylphosphine, triphenylphosphine, diphenylphosphine, tetrahydrothiophene, or triphenylcarbenium.

Examples of such ionic compounds are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
N,N-Dimethylcyclohexylammoniumtetrakis(pentafluorophenyl)borate
N,N-Dimethylbenzylammoniumtetrakis(pentafluorophenyl)borate
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate and/or
Ferroceniumtetrakis(pentafluorophenyl)aluminate.

Preference is given to triphenylcarbeniumtetrakis(pentafluorophenyl)borate and/or N,N-dimethylaniliniumtetrakis (pentafluorophenyl)borate.

Mixtures of at least one Lewis acid and at least one ionic compound can also be used.

Further suitable cocatalyst components are borane or carborane compounds such as:
7,8-dicarbaundecaborane(13),
Undecahydride-7,8-dimethyl-7,8-dicarbaundecaborane,
Dodecahydride-1-phenyl-1,3-di-carbanonaborane,
Tri(butyl)ammoniumundecahydride-8-ethyl-7,9-dicarbaundecaborate,
4-carbanonaborane(14)bis(tri(butyl)ammonium)nonaborate,
Bis(tri(butyl)ammonium)undecaborate,
Bis(tri(butyl)ammonium)dodecaborate,
Bis(tri(butyl)ammonium)decachlorodecaborate,
Tri(butyl)ammonium-1-carbadecaborate,
Tri(butyl)ammonium-1-carbadodecaborate,
Tri(butyl)ammonium-1-trimethylsilyl-1-carbadecaborate,
Tri(butyl)ammoniumbis(nonahydride-1,3-di-carbonnonaborate)cobaltate(III),
Tri(butyl)ammoniumbis(undecahydride-7,8-icarbaundecaborate)ferrate(III).

Further useful co-catalyst systems are combinations of at least one of the aforementioned amines and if desired, a support with organo-element compounds, as they are described in patent WO 99/40129 (and equivalent U.S. Pat. No. 6,482,902), the entireties of which are incorporated herein by reference.

The supports with organoelement compounds named in WO99/40129 are also components of this invention.

Preferred components of these co-catalyst systems are the compounds of Formulas A and B,

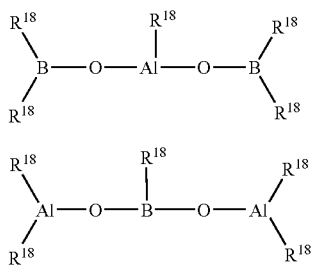

Formula A

Formula B whereby:

$R^{18}$ is a hydrogen atom, a halogen atom, a $C_1$-$C_{20}$ carbonaceous group, in particular $C_1$-$C_{20}$ alkyl, $C_1$-$C_{20}$ haloalkyl, $C_1$-$C_{10}$ alkoxy, $C_6$-$C_{20}$ aryl, $C_6$-$C_{20}$ haloaryl, $C_6$-$C_{20}$ aryloxy, $C_7$-$C_{20}$ arylalkyl, $C_7$-$C_{40}$ haloarylalkyl, $C_7$-$C_{20}$ alkylaryl or $C_7$-$C_{20}$ haloalkylaryl. $R^{18}$ can also be an $OSiR_3$ group, whereby R is identical or different and has the same meaning as $R^{18}$.

Further preferred co-catalysts are general compounds that are formed by the reaction of at least one compound of Formula C and/or D and/or E with at least one compound of formula F.

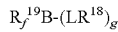 Formula C

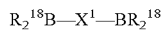 Formula D

Formula E

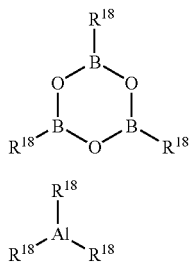

Formula F whereby:

$R^{18}$ has the same meaning as mentioned above; and $R^{19}$ can be a hydrogen atom or a boron free $C_1$-$C_{20}$ carbonaceous group such as $C_1$-$C_{20}$ alkyl, $C_6$-$C_{20}$ aryl, $C_7$-$C_{20}$ arylalkyl, $C_7$-$C_{20}$ alkylaryl; and $X^1$ is an element of the $16^{th}$ group of the periodic table or an NR group, whereby R is a hydrogen atom or a $C_1$-$C_{20}$ hydrocarbon radical such as $C_1$-$C_{20}$-Alkyl or $C_1$-$C_{20}$ Aryl; and L is an element of the $16^{th}$ group of the periodic table or an NR group, whereby R is a hydrogen atom or a $C_1$-$C_{20}$ hydrocarbon radical such as $C_1$-$C_{20}$-alkyl or $C_1$-$C_{20}$ aryl;

f is an integer from 0 to 3;

g is an integer from 0 to 3, whereby z+y cannot equal 0;

h is an integer from 1 to 10.

If desired, the organoelement compounds are combined with an organometallic compound of Formulas II to V and/or VI,

 Formula VI whereby $M^3$ is an element of the $1^{st}$, $2^{nd}$, or $13^{th}$ group of the periodic table, $R^{20}$ is identical or different and is a hydrogen atom, a halogen atom, a $C_1$-$C_{40}$ carbonaceous group, in particular a $C_1$-$C_{20}$ alkyl, a $C_6$-$C_{20}$ aryl, a $C_7$-$C_{20}$ aryl-alkyl, or a $C_7$-$C_{20}$ alkyl-aryl group, r is an integer from 1 to 3 and k is an integer of 1 to 4.

Examples for the co-catalytically effective compounds of Formulas A and B are:

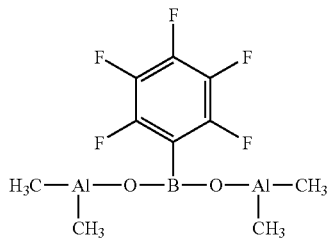

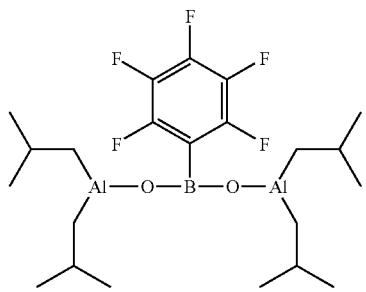

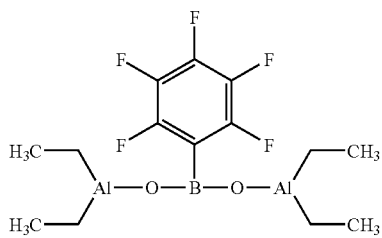

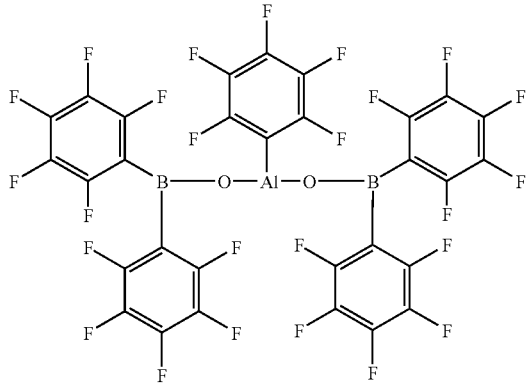

-continued

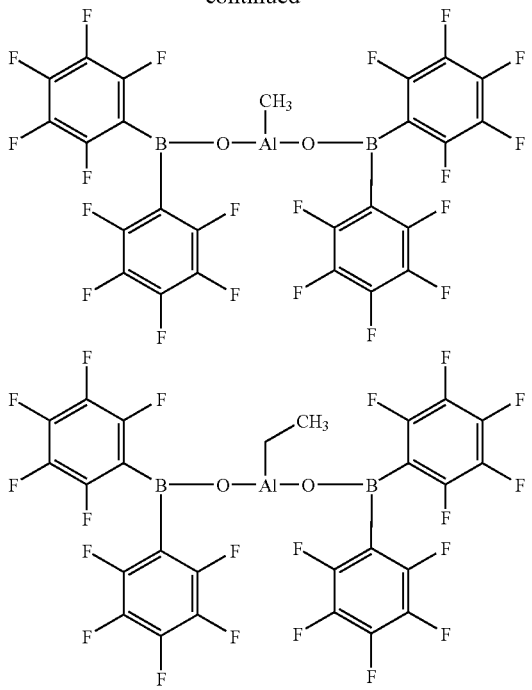

The organometallic compounds of Formula F are preferably uncharged Lewis acids, whereby $M^2$ stands for lithium, magnesium and/or aluminum, in particular aluminum. Examples of preferred organometallic compounds of Formula F are trimethylaluminum, triethylaluminum, triisopropylaluminum, trihexylaluminum, trioctylaluminum, tri-n-butylaluminum, tri-n-propylaluminum, triisoprenealuminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum(trimethylsiloxide), dimethylaluminum(triethylsiloxide), phenylalane, pentafluorophenylalane, and o-tolylalane.

Further co-catalysts, which may be in unsupported or supported form, are the compounds mentioned in EP-A-924223 (equivalent of U.S. Pat. No. 6,444,603), DE-A-19622207, EP-A-601830 (equivalent of U.S. Pat. No. 5,449,650), EP-A-824112 (equivalent of U.S. Pat. No. 6,329,313), EP-A-824113 (equivalent of U.S. Pat. No. 6,124,231), EP-A-811627 (equivalent of U.S. Pat. No. 6,255,531), WO9711775 (equivalent of U.S. Pat. No. 6,271,164), and DE-A-19606167 (equivalent of U.S. Pat. No. 6,350,829), the entireties of which are incorporated herein by references.

Moreover, the catalysts according to the invention can be homogeneously as well as well as heterogeneously supported.

In a preferred embodiment, the compound of Formula I used in the process according to the invention is used in a supported form.

The support component of the catalyst system can be any organic or inorganic, inert solid, in particular a porous support such as talc, inorganic oxides and finely divided polymer powder (e.g., polyolefin).

Suitable inorganic oxides may be found in the groups 2, 3, 4, 5, 13, 14, 15, and 16 of the periodic table. Examples for the oxides preferred as supports include silicon dioxide, aluminum oxide, and also mixed oxides of the elements calcium, aluminum, silicon, magnesium, titanium and corresponding oxide mixtures as well as hydrotalcite. Other inorganic oxides that can be used either alone or in combination with the aforementioned preferred oxidic supports, are, e.g., MgO, $ZrO_2$, $TiO_2$ or $B_2O_3$, to name a few.

The support materials used have a specific surface area in the range from 10 to 1000 $m^2$/g, a pore volume in the range from 0.1 to 5 ml/g and a mean particle size of 1 to 500 μm. Preference is given to supports with a specific surface area in the range of 50 to 500 $m^2$/g, a pore volume in the range from 0.5 to 3.5 ml/g and a mean particle size in the range of 5 to 350 μm. Particular preference is given to supports having a specific surface area in the range from 200 to 400 $m^2$/g, a pore volume in the range from 0.8 to 3.0 ml/g, and a mean particle size of 10 to 200 μm.

If the support material naturally exhibits a low moisture content or residual solvent content, the dehydration or drying before use can be omitted. If this is not the case, as when using silica gel as support material, dehydration or drying is advisable. Thermal dehydration or drying of the support material can be carried out under a vacuum and a simultaneous blanketing with inert gas (e.g., nitrogen). The drying temperature is in the range from 100 to 1000° C., preferably from 200 to 800° C. The pressure is not critical in this instance. The drying process can last from 1 to 24 hours. Shorter or longer drying times are possible, provided that establishment of equilibrium with the hydroxyl groups on the support surface can take place under the conditions chosen, which normally takes from 4 to 8 hours.

Dehydration or drying of the support material can also be carried out by chemical means, by reacting the adsorbed water and the hydroxyl groups on the surface with suitable passivating agents. Reaction with the passivating reagent can convert all or part of the hydroxyl groups into a form which does not lead to any adverse interaction with the catalytically active centers. Suitable passivating agents are, for example, silicon halides and silanes, e.g. silicon tetrachloride, chlorotrimethylsilane, dimethylamino trichlorosilane, or organometallic compounds of aluminum, boron and magnesium, for example trimethylaluminum, triethylaluminum, triisobutylaluminum, triethylborane, dibutylmagnesium. Chemical dehydration or passivation of the support material is carried out, for example, by reacting a suspension of the support material in a suitable solvent with the passivating reagent either in pure form or as a solution in a suitable solvent in the absence of air and moisture. Suitable solvents are, for example, aliphatic or aromatic hydrocarbons such as pentane, hexane, heptane, toluene or xylene. Passivation is carried out at from 25° C. to 120° C., preferably from 50° C. to 70° C. Higher and lower temperatures are possible. The reaction time is from 30 minutes to 20 hours, preferably from 1 to 5 hours. After the chemical dehydration is complete, the support material is isolated by filtration under inert conditions, washed one or more times with suitable inert solvents as described above and subsequently dried in a stream of inert gas or under reduced pressure.

Organic support materials such as finely divided polyolefin powders (e.g., polyethylene, polypropylene or polystyrene) can also be used and should likewise be freed of adhering moisture, solvent radicals or other impurities by appropriate purification and drying operations prior to use.

To prepare the supported catalyst system, at least one of the above-described compounds of Formula I is brought in contact with at least one co-catalyst component in a suitable solvent, preferably giving a soluble reaction product, an adduct or a mixture.

The preparation so obtained is then mixed with the dehydrated or passivated support material, the solvent removed and the resulting supported catalyst system dried, to ensure that all or most of the solvent is removed from the pores of the support materials. The supported catalyst is obtained as a free flowing powder.

Another object of the present invention is a process to provide a free flowing and, if desired, pre-polymerized supported catalyst system comprising the following steps:
a) preparation of a mixture of at least one compound of Formula I and at least one co-catalyst in a suitable solvent or suspension medium;
b) application of the mixture obtained from Step a) to a porous, preferably inorganic, dehydrated support;
c) removal of most of the solvent from the resulting mixture;
d) isolation of the supported catalyst system; and
e) if desired, a pre-polymerization of the supported catalyst system obtained using one or several olefinic monomer(s), to obtain a pre-polymerized supported catalyst system.

Preferred solvents in step a) are hydrocarbons and hydrocarbon mixtures that are liquid at the reaction temperature chosen and in which the individual components are preferably dissolved. The solubility of the individual components is, however, not a prerequisite, as long as the reaction product from the compound of Formula I and the co-catalyst is soluble in the solvent chosen. Examples for the suitable solvents include alkanes such as pentane, isopentane, hexane, heptane, octane, and nonane; cycloalkanes such as cyclopentane and cyclohexane; and aromatics such as benzene, toluene, ethylbenzene and diethylbenzene. Very particular preference is given to toluene.

The amounts of aluminoxane and compound of Formula I used in the preparation of the supported catalyst system can be varied over a wide range. Preference is given to a molar ratio of aluminum to transition metal in the compound of Formula I of 10:1 to 1000:1, very particularly preferably from 50:1 to 500:1.

In the case of methylaluminoxane preference is given to using 30% strength toluene solutions; the use of 10% strength solutions is, however, also possible. To carry out the preactivation, the compound of Formula I in the form of a solid is dissolved in a solution of the aluminoxane in a suitable solvent. It is also possible to dissolve the compound of Formula I separately in a suitable solvent and then to combine this solution with the aluminoxane solution. Preference is given to using toluene.

The preactivation time is from 1 minute to 200 hours.

The preactivation can take place at room temperature (25° C.). The use of higher temperatures can, in certain cases, shorten the time required for the preactivation and produce an additional increase in activity. In this case, a higher temperature means a range from 50° C. to 10° C.

The pre-activated solution or the mixture is then combined with an inert support material, usually silica gel, which is in the form of a dry powder or as a suspension in one of the aforementioned solvents.

Preference is given to using the support material in the form of powder. The order of addition is immaterial. The preactivated metallocene co-catalyst solution or the metallocene co-catalyst mixture can be added to the support material or else the support material can be introduced to the catalyst mixture.

The volume of the preactivated solution or the metallocene co-catalyst mixture can exceed 100% of the total pore volume of the support material used or else can be up to 100% of the total pore volume.

The temperature at which the preactivated solution or the metallocene co-catalyst mixture is brought in contact with the support material can vary in the range from 0° C. to 100° C. Lower or higher temperatures are, however, also possible.

All or the major part of the solvent is subsequently removed from the supported catalyst system, whereby the mixture can be stirred and, if necessary, also heated. Preference is given to removing both the visible portion of the solvent as well as the portion in the pores of the support material. The removal of the solvent can be carried out in a conventional fashion with application of vacuum and/or flushing with inert gas. In the drying process, the mixture can be heated until the free solvent has been removed, which usually takes from 1 to 3 hours at a preferred temperature of from 30° C. to 60° C. The free solvent is the visible portion of solvent in the mixture. In this context, residual solvent is the portion which is enclosed in the pores. As an alternative to complete removal of the solvent, it is also possible for the supported catalyst system to be dried only to a particular residual solvent content, with the free solvent having been completely removed. The supported catalyst system can subsequently be washed with a low-boiling hydrocarbon such as pentane or hexane and dried again.

The supported catalyst system can either be used directly for the polymerization of olefins or can be prepolymerized using one or more olefinic monomers prior to use in a polymerization process. An example of the prepolymerization of supported catalyst systems is described in WO 94/28034.

A small amount of an olefin, preferably an α-olefin (for example vinyl cyclohexane, styrene or phenyldimethylvinylsilane) as modifying component or an anti-static (as described in U.S. patent application Ser. No. 08/365,280) can be added as additive during or after the preparation of the supported catalyst system. The molar ratio of additive to metallocene components (compound according to Formula I) is preferably from 1:1000 to 1000:1, very particularly preferably from 1:20 to 20:1.

Another object of the invention is the use of the catalyst systems according to the invention, containing at least one compound according to Formula I and at least one co-catalyst to manufacture ultra high molecular weight ethylene homo- or co-polymers.

Particular preference is given to the catalyst system being present in a supported form.

The invention is depicted through the following examples, which are not intended to limit the invention, the scope of which is set forth in the appended claims.

General information: preparation and handling of organometallic compounds were carried out in the absence of air and moisture under argon (using the Schlenk technique or a glove box). All solvents required were purged with argon and dried over molecular sieves before use.

The following catalysts are used in the examples:

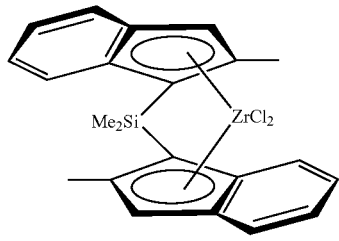

1

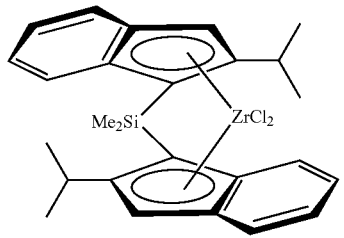

2

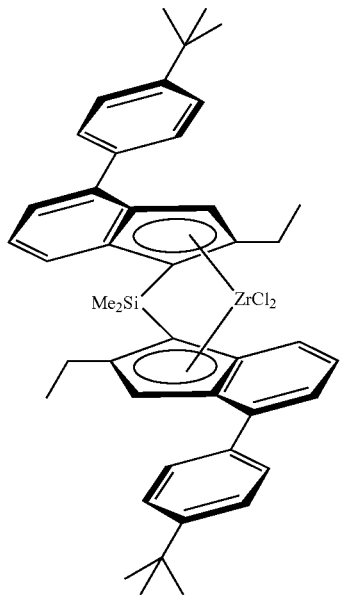

3

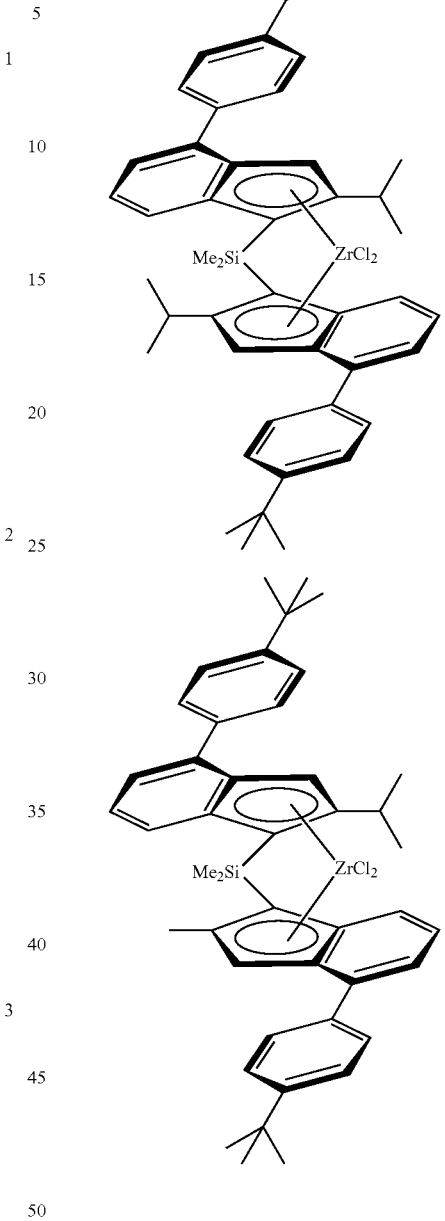

4

5

Example 1

Production of the Supported Catalysts

1. Activation:

In an annealed flask under inert gas 0.128 mmol catalyst is dissolved in 20 ml toluene and mixed with 6 ml (28.8 mmol, 1.672 g) MAO (30% in toluene). The mixture is stirred for one hour at room temperature.

2. Support:

In an annealed flask under inert gas 6 g SiO$_2$ (Grace XPO 2107, dried) is placed and suspended with 30 ml abs. toluene. A suspension results that can be slightly stirred, to which the activated catalyst (from 1) is then added. It is stirred for 10 min and then the solvent is removed in a vacuum to up to no more than 5% residual moisture.

Examples 2-6

Homopolymerization of Ethylene

In a 2 L steel autoclave 1.5 L Exxsol is placed and mixed with 15 mmol of an aluminum alkyl (e.g., tri-isobutylaluminum). The reactor is then brought to the desired temperature and an ethylene pressure of 7-15 bar is built up. At the start of the polymerization 9 μmol of the relevant catalyst (see table 1) suspended in Exxsol is added. It is polymerized for one hour and the reaction is stopped when the ethylene pressure degrades. The polymer is filtered and dried in a vacuum at 80° C. Finally, the yield and the molecular weight are determined.

| Example | Catalyst | Pressure C2 | Temperature | Yield | $M_v$ |
|---|---|---|---|---|---|
| 2 (comparison) | 1 | 10 bar | 70° C. | 70 g | $0.7 \times 10^6$ g/mol |
| 3 | 2 | 10 bar | 70° C. | 61 g | $2.2 \times 10^6$ g/mol |
| 4 | 3 | 10 bar | 70° C. | 64 g | $1.1 \times 10^6$ g/mol |
| 5 | 4 | 10 bar | 70° C. | 98 g | $1.8 \times 10^6$ g/mol |
| 6 | 5 | 10 bar | 70° C. | 114 g | $2.7 \times 10^6$ g/mol |

The above table therefore shows that ultra high molecular weight products are formed only when the bridged metallocene catalysts of the invention are used. Additionally, in several embodiments, the inventive catalyst provided for significantly improved yields.

While the invention has been illustrated in connection with several examples, modifications to these examples within the spirit and scope of the invention will be readily apparent to those of skill in the art. In view of the foregoing discussion, relevant knowledge in the art and references discussed above, the disclosures of which are all incorporated herein by reference, further description is deemed unnecessary.

What is claimed is:

1. A process of manufacturing ultra high molecular weight ethylene polymers comprising predominantly polyethylene, wherein the process comprises reacting ethylene in the presence of a catalyst system which includes a compound of Formula I to produce a polymer having a viscosimetrically determined molecular weight of greater than $1 \times 10^6$ g/mol Formula I

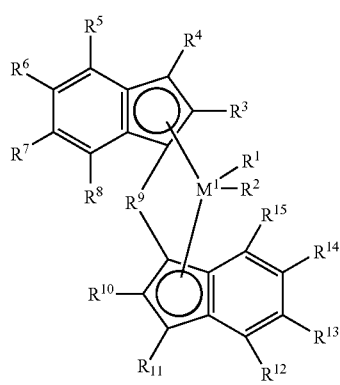

whereby:

$M^1$ is a transition metal of the 4th to 6th group of the periodic table, wherein the oxidation level of said transition metal does not equal zero;

$R^1$ is equal to hydrogen or a $C_1$-$C_{20}$-carbonaceous group or a halogen atom;

$R^2$ is equal to hydrogen or a $C_1$-$C_{20}$ carbonaceous group or a halogen atom;

$R^3$, $R^{10}$ are each identical or different and are a $C_1$-$C_{20}$ carbonaceous group, provided that at least one radical $R^3$ or $R^{10}$ is a $C_2$-$C_{20}$ carbonaceous group;

$R^4$, $R^5$, $R^6$, $R^7$, $R^8$, $R^{11}$, $R^{12}$, $R^{13}$, $R^{14}$, $R^{15}$ are each identical or different and are a hydrogen or a halogen atom or a $C_1$-$C_{20}$ carbonaceous group, whereby, optionally, two or several consecutively form a cyclic system; and $R^9$ is a bridge between the ligands, which is represented by the following formulas:

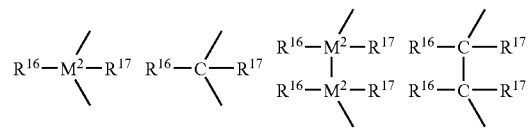

whereby:

$M^2$ is either silicon, germanium or tin; and $R^{16}$, $R^{17}$ are each identical or different and are each hydrogen or a $C_1$-$C_{20}$ carbonaceous group or a halogen atom.

2. The process according to claim 1, wherein $M^1$ is selected from the group consisting of Ti, Zr, Hf, V, Mo, Cr and Nb.

3. The process according to claim 1, wherein at least one of $R^4$, $R^5$, $R^6$, $R^7$, $R^8$, $R^{11}$, $R^{12}$, $R^{13}$, $R^{14}$, and $R^{15}$ includes a cyclic group.

4. The process according to claim 1, wherein for the compound of Formula I:

$M^1$ is a transition metal of the 4th group of the periodic table, wherein the oxidation level of said transition metal does not equal zero;

$R^1$ is hydrogen or a $C_1$-$C_{20}$-carbonaceous group or a halogen atom;

$R^2$ is hydrogen or a $C_1$-$C_{20}$ carbonaceous group or a halogen atom;

$R^3$ is a $C_2$-$C_{20}$ carbonaceous group;

$R^{10}$ is a $C_1$-$C_{10}$ carbonaceous group;

$R^4$, $R^6$, $R^7$, $R^8$, $R^{11}$, $R^{13}$, $R^{14}$, $R^{15}$ are each hydrogen;

$R^5$, $R^{12}$ are each identical or different and are a $C_1$-$C_{20}$ carbonaceous group, of which at least one includes a cyclic group; and $R^9$ is a bridge between the ligands, which is represented by the following formulas:

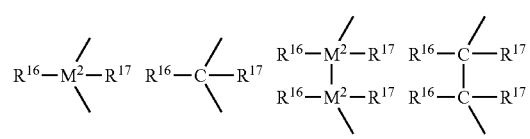

whereby:

$M^2$ is silicon; and $R^{16}$, $R^{17}$ are each identical or different and equal to hydrogen or a $C_1$-$C_{20}$ carbonaceous group or a halogen atom.

5. The process according to claim 4, wherein $R^5$, $R^{12}$ are identical or different and are selected from the group consisting of $C_6$-$C_{20}$ aryl, $C_6$-$C_{20}$ fluoroaryl, $C_6$-$C_{20}$ aryloxy, $C_7$-$C_{20}$ arylalkyl, $C_7$-$C_{20}$ alkylaryl, $C_7$-$C_{20}$ aryloxyaryl, $C_4$-$C_{20}$ heterocycloalkyl, $C_8$-$C_{20}$ arylalkenyl, and $C_8$-$C_{20}$ arylalkinyl.

6. The process according to claim 4, wherein both of $R^5$ and $R^{12}$ include a cyclic group.

7. The process according to claim 4, wherein $R^3$ is an α- or β-position branched carbonaceous group or a carbonaceous group cyclized in a α- or β-position.

8. The process according to claim 1, wherein for the compound of Formula I:

$M^1$ is zirconium; and $R^1$, $R^2$ are identical and are each chlorine, methyl or phenolate; and $R^3$ is an isopropyl-, isobutyl-, cyclopentyl-, cyclohexyl-, tert-butyl-, or a phenyl group; and $R^{10}$ is a $C_1$-$C_{10}$ carbonaceous group and is an alkyl group; and $R^4$, $R^6$, $R^7$, $R^8$, $R^{11}$, $R^{13}$, $R^{14}$, $R^{15}$ are each hydrogen; and $R^5$, $R^{12}$ are identical or different and are a $C_1$-$C_{20}$ carbonaceous group, where at least one includes a phenyl group which supports a $C_1$-$C_4$-alkyl group; and $R^9$ is a bridge between the ligands, which is represented by the following formulas:

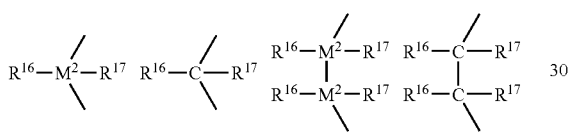

whereby:

$M^2$ is silicon; and $R^{16}$, $R^{17}$ are each identical or different and are hydrogen or a $C_1$-$C_{20}$ carbonaceous group or a halogen atom.

9. The process according to claim 8, wherein $R^5$, $R^{12}$ are identical and include a phenyl group which supports a $C_1$-$C_4$-alkyl group in the para position.

10. The process according to claim 1, wherein the compound of Formula I has a structure corresponding to one or more of the following:

a)
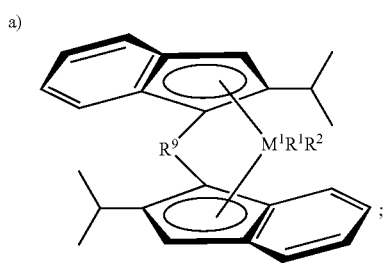

b)
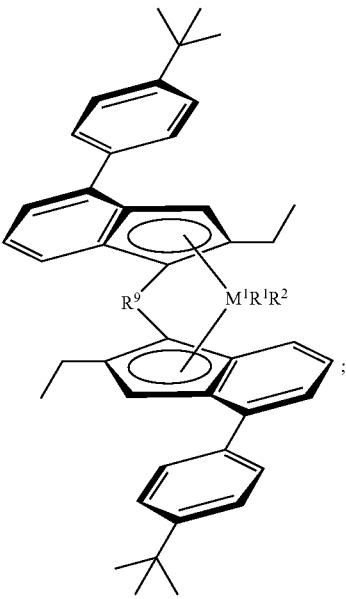

c)
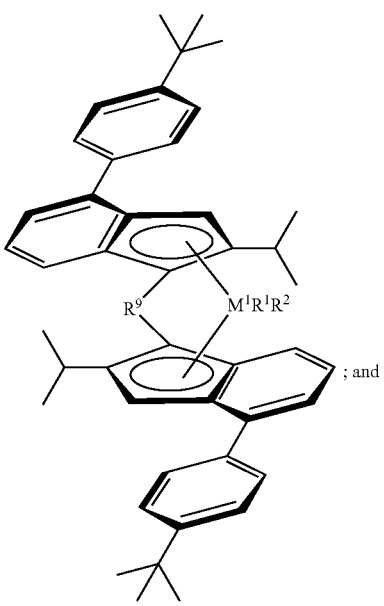
; and

-continued d)

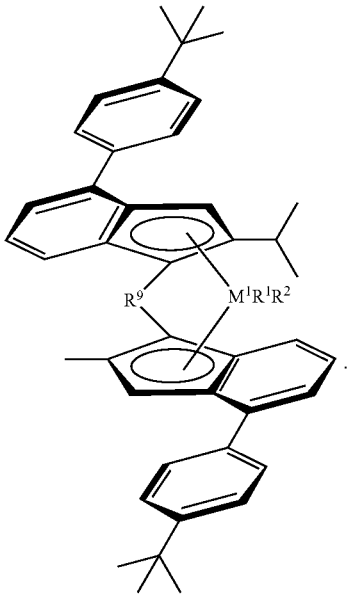

11. The process according to claim 1, wherein the compound of Formula I has a structure corresponding to the following formula:

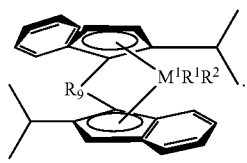

12. The process according to claim 1, wherein the compound of Formula I has a structure corresponding to the following formula:

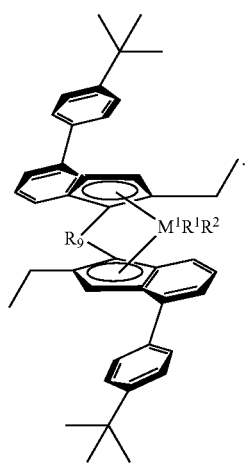

13. The process according to claim 1, wherein the compound of Formula I has a structure corresponding to the following formula:

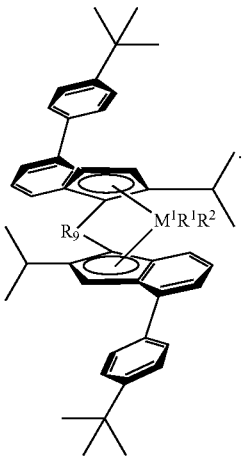

14. The process according to claim 1, wherein the compound of Formula I has a structure corresponding to the following formula:

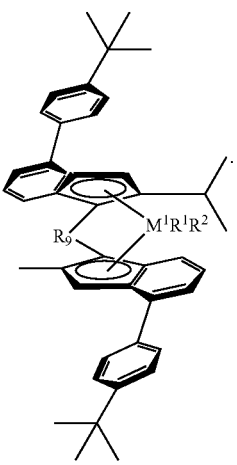

15. The process according to claim 1, wherein the compound in Formula I is present in a supported form.

16. The process according to claim 1, whereby the ethylene used in the process contains additional olefins with 3-20 carbon atoms.

17. The process according to claim 16, whereby the ethylene used in the process contains additional olefins with 3-10 carbon atoms.

18. The process according to claim 16, wherein the additional olefins are selected from the group consisting of propene, butene, 1-pentene, 1-hexene, 1-decene, 4-methyl-1-pentene, 1-octene, styrene, 1,3-butadiene, 1,4-hexadiene, vinyl norbornene, norbornadiene, ethyl norbornadiene, norbornene, cyclopentadiene, tetracyclododecene, methylnorbornene, and combinations thereof.

19. The process according to claim 1, wherein the ethylene is copolymerized with an alpha olefin having 3 to 8 carbon atoms.

20. The process according to claim 19, wherein the alpha olefin is selected from the group consisting propene, butene, 1-pentene, 1-hexene, styrene, butadiene, and combinations thereof.

21. The process according to claim 1, wherein the ethylene is homopolymerized.

22. The process according to claim 1, wherein the ethylene is co-polymerized with propene.

23. The process according to claim 1, wherein the process produces a polymer having a molecular weight distribution $M_w/M_n$ of from 2 to 6.

24. A method of using a catalyst system to produce ultra-high molecular weight ethylene homopolymer or copolymers, wherein the method comprises reacting ethylene in the presence of said catalyst system to produce a polymer comprising predominantly polyethylene having a viscosimetrically determined molecular weight of greater than $1 \times 10^6$ q/mol, wherein said catalyst system contains:

(i) at least one catalyst having the formula:

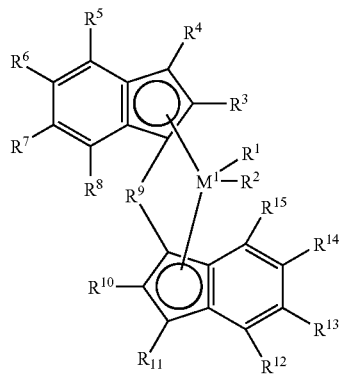

Formula I whereby:
- $M^1$ is a transition metal of the $4^{th}$ to $6^{th}$ group of the periodic table, wherein the oxidation level of said transition metal does not equal zero;
- $R^1$ is equal to hydrogen or a $C_1$-$C_{20}$-carbonaceous group or a halogen atom;
- $R^2$ is equal to hydrogen or a $C_1$-$C_{20}$ carbonaceous group or a halogen atom;
- $R^3$, $R^{10}$ are each identical or different and are a $C_1$-$C_{20}$ carbonaceous group, provided that at least one radical $R^3$ or $R^{10}$ is a $C_2$-$C_{20}$ carbonaceous group;
- $R^4$, $R^5$, $R^6$, $R^7$, $R^8$, $R^{11}$, $R^{12}$, $R^{13}$, $R^{14}$, $R^{15}$ are each identical or different and are a hydrogen or a halogen atom or a $C_1$-$C_{20}$ carbonaceous group, whereby, optionally, two or several consecutively form a cyclic system; and
- $R^9$ is a bridge between the ligands, which is represented by the following formulas:

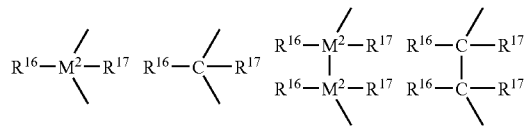

whereby:
- $M^2$ is either silicon, germanium or tin; and
- $R^{16}$, $R^{17}$ are each identical or different and are each hydrogen or a $C_1$-$C_{20}$ carbonaceous group or a halogen atom; and (ii) at least one co-catalyst.

25. The process according to claim 24, wherein the co-catalyst is a Lewis acid.

26. The process according to claim 24, wherein the co-catalyst is an aluminoxane compound.

27. The process according to claim 24, wherein the co-catalyst is a methylaluminoxane compound.

28. A process of manufacturing ultra high molecular weight ethylene polymers comprising predominantly polyethylene, wherein the process comprises reacting ethylene in the presence of a catalyst system to produce a polymer having a viscosimetrically determined molecular weight of greater than $1 \times 10^6$ g/mol, wherein the catalyst system comprises a bridged metallocene catalyst compound having a zirconium dichloride central functionality and a dimethyl silandiyl bridge between five-membered rings of the metallocene compound, and wherein the rings are indenyl, with the proviso that both rings are substituted at the 2-position with respect to the dimethyl silanediyl bridge with a $C_1$-$C_{20}$ carbonaceous group and at least one of the rings is substituted with a $C_2$-$C_{20}$ carbonaceous group at the 2 position with respect to the dimethyl silandiyl bridge.

* * * * *

UNITED STATES PATENT AND TRADEMARK OFFICE
CERTIFICATE OF CORRECTION

PATENT NO.        : 7,598,329 B2
APPLICATION NO.   : 11/592538
DATED             : October 6, 2009
INVENTOR(S)       : Tim Dickner et al.

It is certified that error appears in the above-identified patent and that said Letters Patent is hereby corrected as shown below:

Change the order of the inventors' names (75) from "Jens Panitzky, Dorsten (DE); Jens Ehlers, Hamminkeln (DE); Tim Dickner, Frankfurt (DE); Jorg Schottek, Idstein (DE)" to --Tim Dickner, Frankfurt (DE); Jens Ehlers, Hamminkeln (DE); Jorg Schottek, Idstein (DE), Jens Panitsky, Dorsten (DE)--

Signed and Sealed this

Twentieth Day of July, 2010

David J. Kappos
*Director of the United States Patent and Trademark Office*